United States Patent
Hiroshima et al.

(10) Patent No.: US 11,366,223 B2
(45) Date of Patent: Jun. 21, 2022

(54) ULTRASOUND IMAGING APPARATUS, IMAGE PROCESSING APPARATUS, AND IMAGE PROCESSING PROGRAM

(71) Applicant: Hitachi, Ltd., Tokyo (JP)

(72) Inventors: Misaki Hiroshima, Tokyo (JP); Hiroshi Kuribara, Tokyo (JP)

(73) Assignee: FUJIFILM HEALTHCARE CORPORATION, Chiba (JP)

( * ) Notice: Subject to any disclaimer, the term of this patent is extended or adjusted under 35 U.S.C. 154(b) by 410 days.

(21) Appl. No.: 16/736,855

(22) Filed: Jan. 8, 2020

(65) Prior Publication Data

US 2020/0278446 A1  Sep. 3, 2020

(30) Foreign Application Priority Data

Feb. 28, 2019 (JP) .............................. JP2019-036618

(51) Int. Cl.
*G01S 15/00* (2020.01)
*G01S 15/89* (2006.01)
*G10K 11/34* (2006.01)
*G06T 7/73* (2017.01)

(52) U.S. Cl.
CPC ...... *G01S 15/8993* (2013.01); *G01S 15/8918* (2013.01); *G01S 15/8925* (2013.01); *G01S 15/8929* (2013.01); *G01S 15/8977* (2013.01); *G06T 7/73* (2017.01); *G10K 11/34* (2013.01); *G06T 2207/10136* (2013.01)

(58) Field of Classification Search
USPC ......................................................... 73/632
See application file for complete search history.

(56) References Cited

U.S. PATENT DOCUMENTS

| 2005/0033170 A1* | 2/2005 | Angelsen ............ G01S 7/52038 600/437 |
| 2013/0165791 A1* | 6/2013 | Nagae ................. G01S 15/8977 600/447 |
| 2016/0235485 A1* | 8/2016 | Belohlavek ........... A61M 5/158 |

FOREIGN PATENT DOCUMENTS

| JP | 2016042036 A | * | 3/2016 | ........ G01S 15/8915 |
| JP | 2017000372 A | * | 1/2017 | |
| JP | 2019030623 A | * | 2/2019 | |
| WO | WO-2007027703 A2 | * | 3/2007 | ........ G01S 15/8984 |
| WO | 2007/089580 A2 | | 8/2007 | |
| WO | WO-2012035723 A1 | * | 3/2012 | ........... A61B 8/4444 |

OTHER PUBLICATIONS

David Napolitano, et al., "Sound speed correction in ultrasound imaging", Ultrasonics, vol. 44, pp. 43-46 (2006), ISSN 0041-624X.
(Continued)

*Primary Examiner* — James R Hulka
(74) *Attorney, Agent, or Firm* — Mattingly & Malur, PC (57) ABSTRACT

An image with the sound speed in reception beamforming being changed is generated with a small amount of calculation. A conversion unit 41 converts first real space image data into first wave number space data in a wave number space. A remapping processing unit 42 processes the first wave number space data to generate data equivalent to second wave number space data. A reconversion unit 43 generates a second real space image by inversely converting data equivalent to the second wave number space data.

8 Claims, 5 Drawing Sheets

(56) References Cited

OTHER PUBLICATIONS

Jian-Yu Lu, "2D and 3D High Frame Rate Imaging with Limited Diffraction Beams", IEEE Transactions on Ultrasonics, Ferroelectrics, and Frequency Control, vol. 44, No. 4, pp. 839-856, Jul. 1997.

* cited by examiner

h (SCAN LINE)
u (RECEPTION CHANNEL)
t (RECEPTION TIME)
t (=z)
u (=x)
FIRST DELAY TIME $T_1$ WHEN SOUND SPEED IS $C_0$

[FIG. 3B]

x (SCAN LINE DIRECTION)
z (DEPTH DIRECTION)
$B(C_1)$

ULTRASOUND IMAGING APPARATUS, IMAGE PROCESSING APPARATUS, AND IMAGE PROCESSING PROGRAM

CROSS-REFERENCE TO RELATED APPLICATION

The present application claims priority from Japanese application JP2019-036618, filed on Feb. 28, 2019, the contents of which is hereby incorporated by reference into this application.

TECHNICAL FIELD

The present invention relates to an ultrasound imaging apparatus.

BACKGROUND ART

In ultrasound imaging, echo propagation time is measured with an ultrasonic element array, and an obtained reception signal (channel RF signal) is subjected to reception beamforming processing such as addition after being delayed according to distances between a reception focal point and respective ultrasonic elements. Accordingly, a phasing signal (also referred to as a spatial RF signal or line data) for a reception focal point row arranged in a line is obtained, and an ultrasound image in which the intensity of the phasing signal is taken as a pixel value is generated. It is necessary to set delay time of the reception signal during reception beamforming according to the distances between the reception focal point and the ultrasonic elements, in general, the delay time is calculated on the assumption of an average value of sound speeds of ultrasonic waves propagating in a living body.

However, the sound speed propagating in the living body varies depending on tissue such as fat and muscle, and there are also individual differences. If the assumed sound speed value used to calculate the delay time is different from the actual sound speed, coherency of signals after phasing addition after the reception beamforming decreases, leading to lower image quality.

Therefore, Non-PTL 1 proposes a method of, for example, generating a plurality of images by variously changing sound speed in a predetermined range and interval, and evaluating these images with indexes (for example, a power value of luminance, resolution, contrast and the like) which represent the coherence of phases so as to set the sound speed with the highest index as sound speed suitable for a living body to be imaged.

Meanwhile, there has been a method called Fourier phasing that obtains an effect similar to that of delaying the reception signal by performing two-dimensional Fourier transform on time-series reception signals for respective ultrasonic elements and performing remapping processing in a frequency space, and then performs two-dimensional inverse Fourier transform to reconstruct an ultrasound image (PTL 1 and Non-PTL 2).

CITATION LIST

Patent Literature

PTL 1: WO 2007/089580

Non-Patent Literature

Non-PTL 1: David Napolitano, et. al, "Sound speed correction in ultrasound imaging, Ultrasonics", Volume 44, p43-46 (2006), ISSN 0041-624X Non-PTL 2: Jian-Yu Lu, "2D and 3D high frame rate imaging with limited diffraction beams," UFFC, vol. 44, no. 4, pp. 839-856, July 1997.

SUMMARY OF INVENTION

Technical Problem

In order to obtain the sound speed suitable for the living body to be imaged, when the plurality of images are generated by changing the sound speed as shown in a technique described in Non-PTL 1, a method is conceivable in which ultrasonic waves are transmitted a plurality of times while the sound speed used for calculating a delay time during ultrasonic transmission beamforming, and the reception signal is subjected to the reception beamforming using the delay time according to the sound speed. However, in order to obtain the sound speed suitable for a target to be imaged, it is necessary to transmit the ultrasonic waves for a plurality of times and to perform reception beamforming processing each time, so that it takes time to image. Meanwhile, another method is conceivable in which the sound speed of the ultrasonic waves at the time of transmission is not changed, and a plurality of ultrasound images where the sound speed during reception beamforming is changed are generated by performing the reception beamforming on the reception signals obtained by one transmission using various types of delay times for various sound speeds. However, in this method, since it is necessary to store all reception signals obtained in one transmission in a storage unit, read out the reception signals from the storage unit, and process the reception signals for a plurality of types of delay times to generate an image, a storage unit having a capacity sufficient to store all the reception signals of the ultrasonic elements is necessary. In either case, it is necessary to perform the reception beamforming for each sound speed, and since the amount of calculation is large, a calculation device having a large processing capability is necessary.

An object of the invention is to generate an image with a sound speed during reception beamforming being changed with a small amount of calculation.

Solution to Problem

In order to achieve the above object, an ultrasound imaging apparatus of the invention includes: an ultrasound imaging unit that receives ultrasonic waves reflected by a target to be imaged that has received transmission of the ultrasonic waves by a row of a plurality of ultrasonic elements, and receives reception signals obtained for respective ultrasonic elements, and generates a first real space image by processing the reception signals using a first delay time determined based on a first sound speed; a conversion unit that converts data of the first real space image into first wave number space data in the wave number space; a remapping processing unit that generates data equivalent to second wave number space data by processing the first wave number space data, the second wave number space data obtained by converting a second real space image obtained when the reception signal is processed with a second delay time determined based on a second sound speed; and a reconversion unit that generates the second real space image by inversely converting the data equivalent to the second wave number space data generated by the remapping processing unit.

Advantageous Effect

According to the invention, it is possible to generate the image with the sound speed during the reception beamforming being changed with a small amount of calculation.

DESCRIPTION OF EMBODIMENTS

Hereinafter, an ultrasound imaging apparatus according to an embodiment of the invention will be described.

The inventors have found that a spatial RF signal equivalent to the spatial RF signal where a sound speed of a delay time used for phasing is changed can be obtained by delaying reception signals (channel RF signals) of each ultrasonic element using a delay time based on a distance between a reception focal point and each of the ultrasonic elements and a predetermined sound speed, and converting a signal phased by adding across channels (also called spatial RF signal or line data) or an ultrasound image generated from the signal into wave number space data and processing the signal or the ultrasound image generated from the signal in wave number space, thus the invention is obtained. Accordingly, the invention can use the spatial RF signal after phasing to correct the sound speed during phasing, so that the invention can generate a plurality of images where the sound speed is changed in a short time without going back to the reception signal (channel RF signal). In addition, it is not necessary to hold the channel RF signal with a large amount of data, so that, for example, it is possible to generate images by transmitting or receiving in real time and correct the sound speed based on the spatial RF signal in the background, and it is also possible to perform image processing where the sound speed is corrected afterward with the saved spatial RF signal in the past.

First Embodiment

Figure 1:
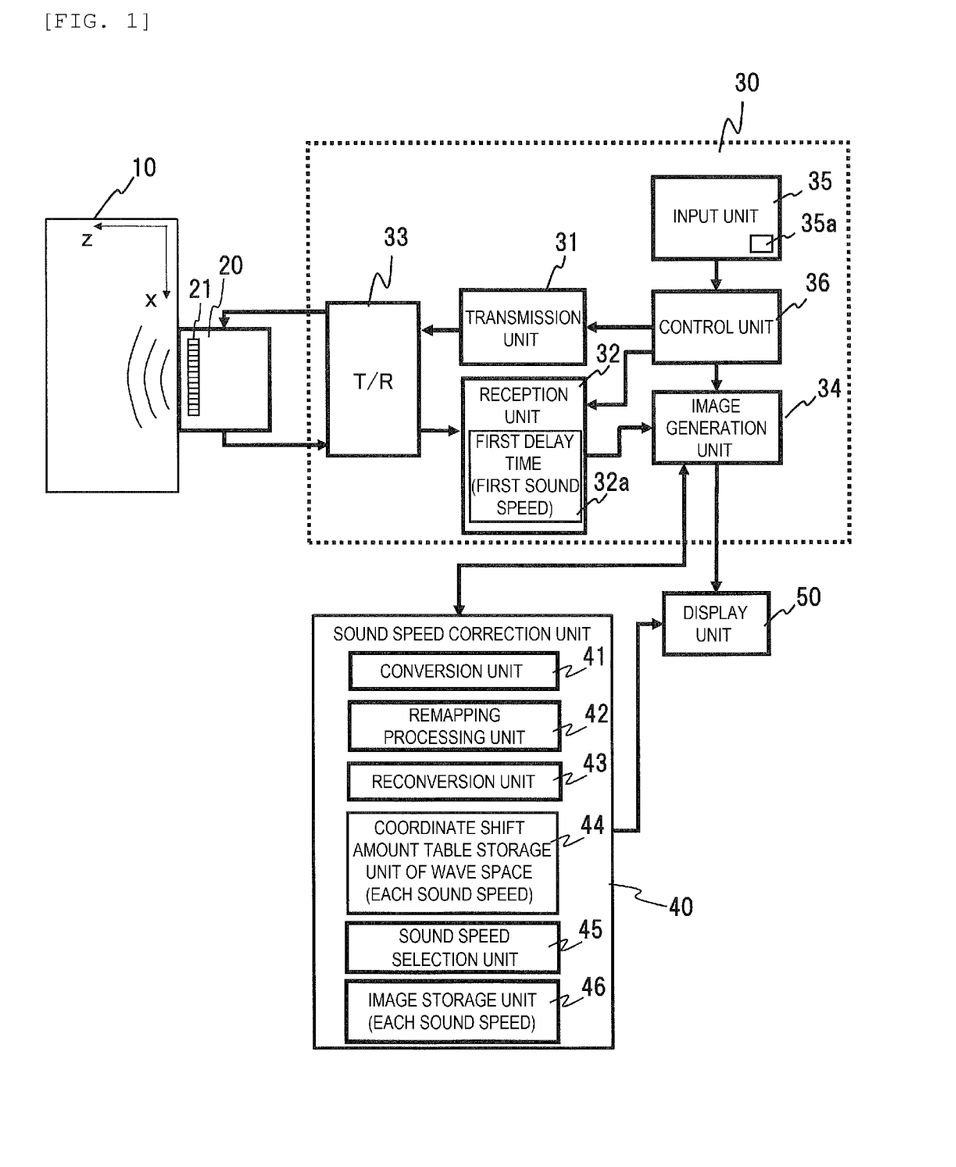
FIG. 1 is a block diagram showing a configuration of an ultrasound imaging apparatus according to a first embodiment.

Hereinafter, an ultrasound imaging apparatus according to a first embodiment will be described. FIG. 1 is a block diagram showing an overall configuration of the ultrasound imaging apparatus of the present embodiment.

As shown in FIG. 1, the ultrasound imaging apparatus of the present embodiment includes an ultrasound imaging unit 30 that generates a first real space image, and a sound speed correction unit 40 that generates a real space image with corrected sound speeds used for image generation. The ultrasound imaging unit 30 is connected to a probe 20 in which a plurality of ultrasonic elements 21 are arranged.

The ultrasound imaging unit 30 includes a transmission unit 31, a reception unit 32, a transmission and reception switching unit (T/R) 33, an image generation unit 34, an input unit 35, and a control unit 36. The transmission unit 31 generates a transmission signal and passes the transmission signal to one or more ultrasonic elements 21 via the transmission and reception switching unit (T/R) 33. The ultrasonic element 21 that has received the transmission signal converts the transmission signal into an ultrasonic wave and transmits the ultrasonic wave to a target to be imaged 10. The ultrasonic wave, for example, reflected by the target to be imaged 10 reaches a row of the plurality of ultrasonic elements 21, and the plurality of ultrasonic elements 21 convert the ultrasonic wave into a reception signal (channel RF signal). The reception unit 32 obtains a signal (spatial RF signal or line data) after reception beamforming processing for a row of reception focal points set along a scan line set in an imaging range by receiving reception signals from the plurality of ultrasonic elements 21 respectively and using a first delay time $T_1$ to phase the reception signal by a known reception beamforming method such as a delay addition method or a Fourier phasing method.

The first delay time $T_1$ described above is a delay time (for example, $T_1=L/C0$) obtained in advance for each ultrasonic element with respect to each reception focal point based on a distance L between the reception focal point and the ultrasonic element 21 and a predetermined first sound speed $C_0$, and it is possible to phase (match the phase of) reflected signals that arrive at respective ultrasonic elements 21 from the reception focal point by delaying the reception signals of the respective ultrasonic elements using the first delay time. The first delay time is stored in advance in a first delay time storage unit 32a in the reception unit 32.

The transmission unit 31 and the reception unit 32 repeat transmission and reception of ultrasonic waves under the control of the control unit 36, and sequentially generate spatial RF signals for the number of scan lines necessary for generating an image.

The image generation unit 34 generates an ultrasound image (first real space image) by arranging the obtained plurality of spatial RF signals. The first real space image is obtained by phasing based on the first sound speed $C_0$ using the first delay time. At this time, the image generation unit 34 may perform transmission aperture synthesis processing in which the spatial RF signals for a plurality of scan lines in a single transmission and reception is obtained and added to spatial RF signals obtained for the same scan lines in another transmission and reception.

The sound speed correction unit 40 includes a conversion unit 41, a remapping processing unit 42, a reconversion unit 43, a table storage unit 44, a sound speed selection unit 45, and an image storage unit 46. The sound speed correction unit 40 generates an image with a sound speed used for calculating the delay time being changed by correcting the image generated by the image generation unit 34. The input unit 35 includes a sound speed correction button 35a for the user to give an instruction of generating an image with the sound speed being changed.

The conversion unit 41 converts data of the first real space image for generating the first real space image in the table storage unit into the first wave number space data in the wave number space. The remapping processing unit 42 generates second wave number space data by, for example, interpolating the first wave number space data. The second wave number space data is equivalent to wave number space data obtained when the reception signal is processed with a second delay time $T_2$ (for example, $T_2=L/C_1$) determined based on the distance L between the reception focal point and the ultrasonic element 21 and a second sound speed $C_1$. The reconversion unit generates the second real space image by inversely converting data equivalent to the second wave number space data generated by the remapping processing unit.

Accordingly, the second real space image equivalent to that generated at the second delay time $T_2$ based on the second sound speed $C_1$ can be generated by the conversion processing and remapping of the first real space image without going back to the reception signal (channel RF signal). The generated first and second real space images are stored in the image storage unit 46.

The remapping processing unit 42 generates the second wave number space data by obtaining sampling coordinate data shifted from sampling coordinates of the data constituting the first wave number space data by a distance obtained in advance based on the first sound speed $C_0$ and the second sound speed $C_1$ by interpolation processing or the like.

The sound speed selection unit 45 calculates and compares an index indicating focus accuracy for a plurality of real space images in the image storage unit 46, and selects a sound speed corresponding to an image with the highest index value. Accordingly, an appropriate sound speed close to an actual sound speed of the target to be imaged can be selected.

Hereinafter, the operation of each unit of the ultrasound imaging apparatus including detailed processing contents of the sound speed correction unit 40 of the present embodiment will be described based on a flowchart of FIG. 2.

The sound speed correction unit 40 is implemented by a computer including a processor such as a central processing unit (CPU) or a graphics processing unit (GPU), and a memory. The CPU reads and executes programs stored in the memory, thereby realizing functions of each unit of the sound speed correction unit 40 by software. In addition, the sound speed correction unit 40 can be partially or entirely realized by hardware. For example, the sound speed correction unit 40 may be implemented with a custom IC such as an application specific integrated circuit (ASIC) or a programmable IC such as a field-programmable gate array FPGA), and the circuit design may be performed so as to realize the function of each unit of the sound speed correction unit 40.

First, the user gives an imaging instruction via the input unit 35 and presses the button 35a when generating an image with the sound speed being corrected. The transmission unit 31 transmits ultrasonic waves from the ultrasonic element 21 toward the target to be imaged 10. The ultrasonic waves reflected by the target to be imaged 10 are converted into reception signals (channel RF signals) by a row of the ultrasonic elements 21. The reception unit 32 receives the reception signals from the plurality of ultrasonic elements 21 respectively (step 201).

Figure 2:
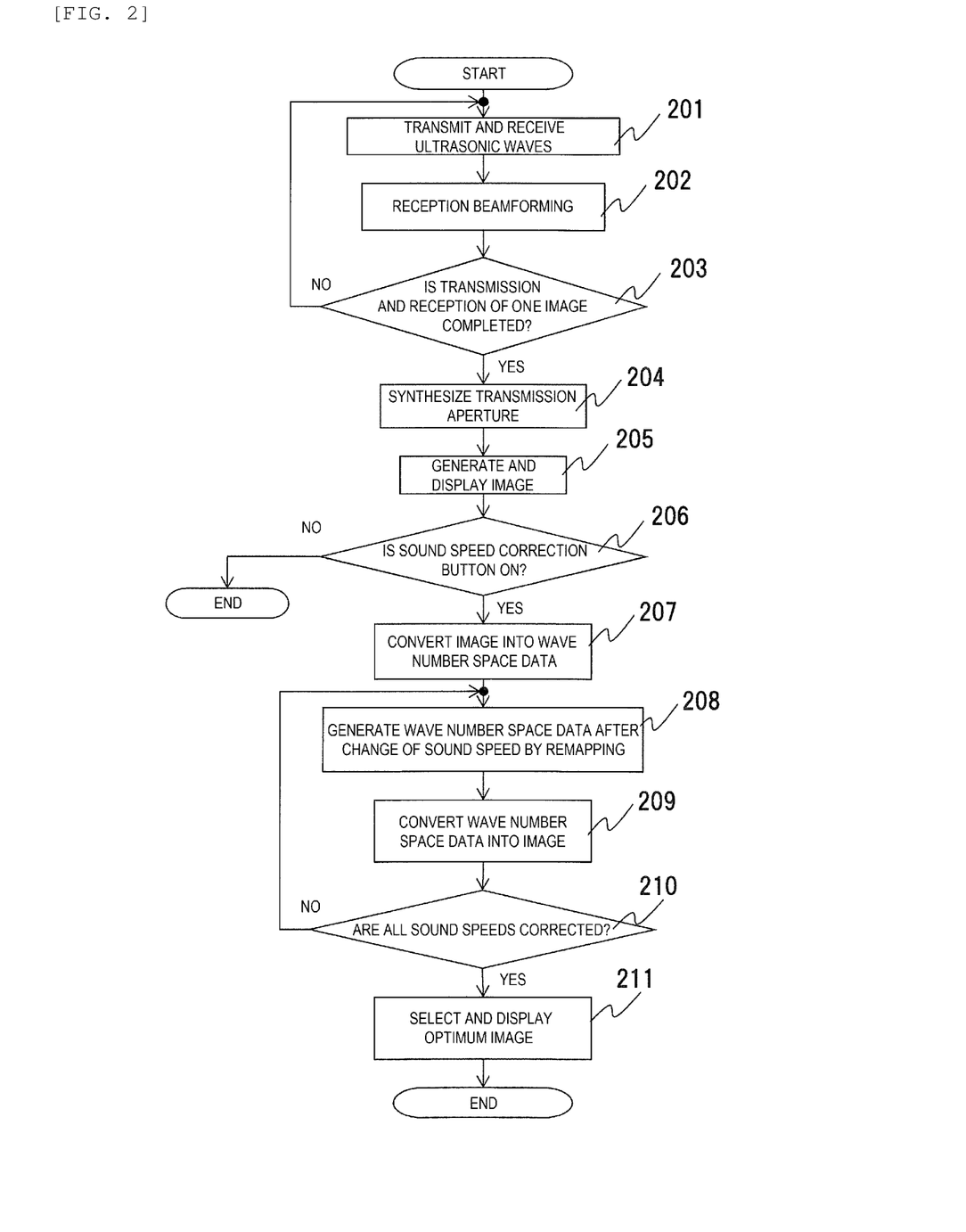
FIG. 2 is a flowchart showing the operation of the ultrasound imaging apparatus according to the first embodiment.
Figure 3A:
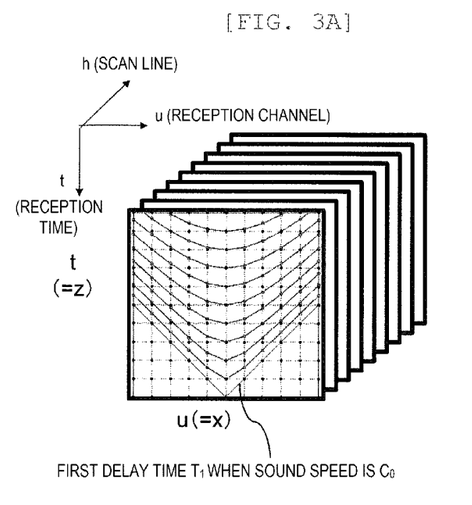
FIG. 3A is an illustrative diagram showing a first delay time of a sound speed $C_0$.
Figure 3B:
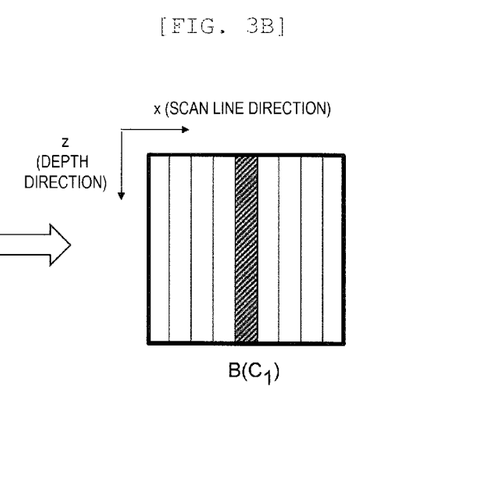
FIG. 3B is an illustrative diagram showing a scan line.

The reception unit 32 obtains a phasing signal (spatial RF signal or line data) along one or more scan lines set in the imaging range by phasing the reception signal (channel RF signal) for each ultrasonic element 21 using the first delay time $T_1$ (see FIG. 3A) stored in advance in the first delay time storage unit 32a by the known reception beamforming method such as a delay addition method or a Fourier phasing method (see step 202, FIG. 3B). The above steps 201 to 202 are repeated until the phasing signals of all the scan lines necessary for generating an image of one frame are obtained (step 203).

The image generation unit 34 generates an image (first real space image) by arranging the phasing signals of the scan lines for one frame, and displays the generated image on a display unit 50 (step 205). The first real space image is obtained by phasing based on the first sound speed $C_0$ using the first delay time. At this time, the image generation unit may perform transmission aperture synthesis. When performing the transmission aperture synthesis, spatial RF signals for a plurality of scan lines in a single transmission and reception are obtained and added to spatial RF signals obtained for the same scan line in other transmissions/receptions (step 204).

The sound speed correction unit 40 confirms whether the sound speed correction button 35a for giving an instruction of generating a sound speed change image of the input unit 35 is turned on by the user. If the button 35a is turned on, an image with the sound speed being changed in step 207 and thereafter is generated (step 206). If the sound speed correction button 35a is not operated to be turned on, the processing ends.

Figure 4A:
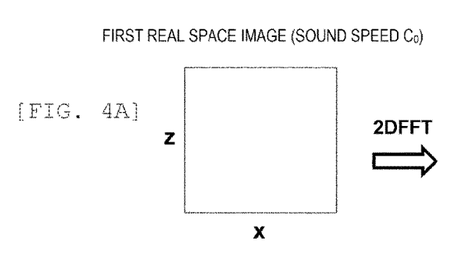
FIG. 4A is a diagram showing a first real space image.
Figure 4B:
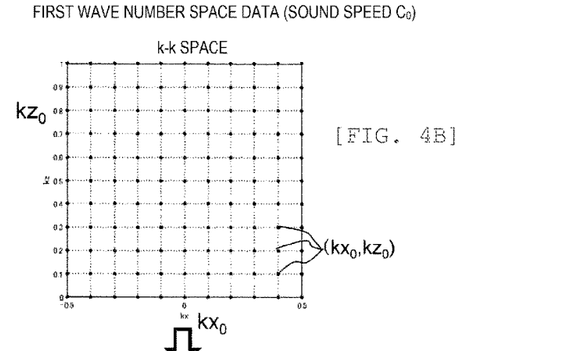
FIG. 4B is a diagram showing first wave number space data.

When the sound speed correction is performed, first, the conversion unit 41 receives the first real space image (see FIG. 4A) from the image generation unit 34, and converts the first real space image into two-dimensional wave number space data by two-dimensional fast Fourier transform or the like (Step 207). The first real space image is a two-dimensional image in the x-z space when a row direction of the ultrasonic elements 21 is the x direction and the depth direction of the imaging target 10 is the z direction. The conversion unit 41 converts the two-dimensional image into two-dimensional wave number space data, in which the two-dimensional wave number space has two axes of a wave number (kx) direction in the x direction and a wave number (kz) direction in the z direction.

Next, the remapping processing unit 42 obtains data values of sampling coordinates $(kx_1, kz_1)$ (coordinates of circles in FIG. 4C) shifted from sampling coordinates $(kx_0, kz_0)$ of the data constituting the first wave number space data by a distance obtained in advance based on the first sound speed $C_0$ and the second sound speed $C_1$ by interpolation calculation or the like. When the data obtained by the interpolation calculation or the like is represented in the wave number space at the second sound speed $(C_1)$, sampling is performed at equal intervals (see FIG. 4D, step 208).

The generated second wave number space data is equivalent to wave number space data obtained by processing the reception signal (channel RF data) with the predetermined second delay time $T_2$ (for example, $T_2=L/C_1$) based on the distance L between the reception focal point and the ultrasonic element 21 and the second sound speed $C_1$.

The coordinates $(kx_1, kz_1)$ are determined by, for example, the following Equations (1) and (2) using the coordinates $(kx_0, kz_0)$ of the data constituting the first wave number space data and the sound speeds C0 and $C_1$. As shown in Equation (1), in the examples of Equations (1) and (2), the coordinates $(kx_0, kz_0)$ corresponding to the sound speed $C_0$ and the coordinates $(kx_1, kz_1)$ corresponding to the sound speed $C_1$ are not shifted in the x direction (column direction of the ultrasonic element 21), but shifted in the z direction.

The sound speed correction unit 40 stores, in the table storage unit 44, in advance a relationship between coordinates ($kx_0$, $kz_0$) of data in the first wave number space and coordinates ($kx_1$, $kz_1$) corresponding to changed coordinates of the data when phasing is performed using the second delay time $T_2$ of the sound speed $C_1$, for example, in the form of a table. Accordingly, the remapping processing unit 42 can read the coordinates ($kx_1$, $kz_1$) and the coordinates ($kx_0$, $kz_0$) by referring to the table storage unit 44, and generate the second wave number space data (FIG. 4D) corresponding to the sound speed $C_1$ calculated by interpolation processing data values of the coordinates ($kx_1$, $kz_1$) of the first wave number space data.

$$k_{x1} = k_{x0} \quad \text{(Equation 1)}$$

$$k_{z1} = \text{sign}(k_{z0})\sqrt{\left(\frac{c_0}{c_1}\right)^2 (k_{x0}^2 + k_{z0}^2) - k_{x0}^2} \quad \text{(Equation 2)}$$

Figure 4C:
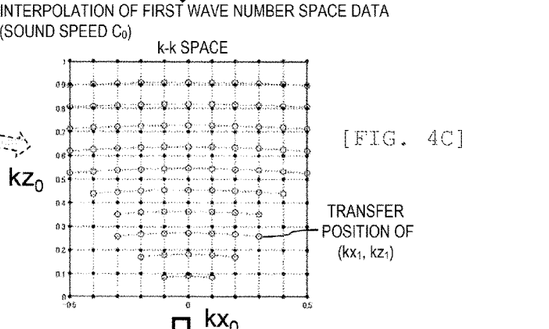
FIG. 4C is a diagram showing interpolation of the first wave number space data.
Figure 4D:
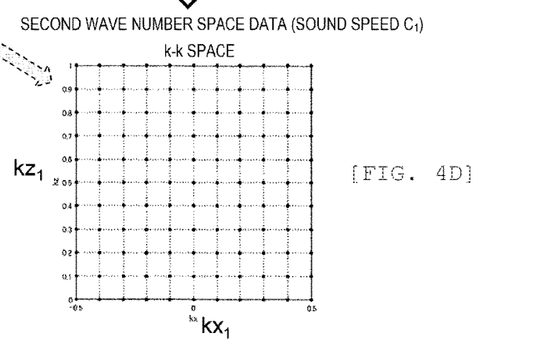
FIG. 4D is a diagram showing second wave number space data.
Figure 4E:
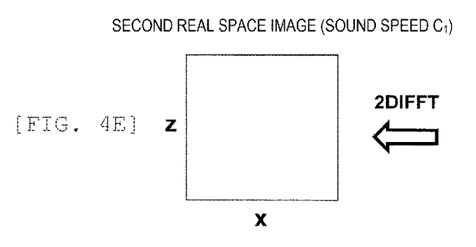
FIG. 4E is a diagram showing a second real space image.
Figure 4F:
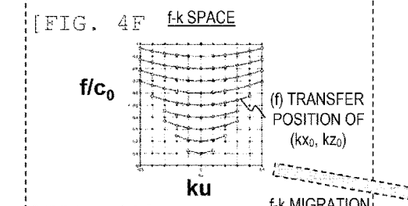
FIG. 4F is a diagram showing a delay time in a real space.
Figure 4G:
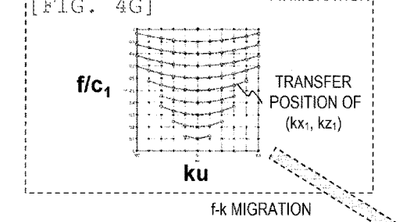
FIG. 4G is a diagram showing a delay time in an f-k space.

Hereinafter, the relationship between the coordinates ($kx_1$, $kz_1$) and the coordinates ($kx_0$, $kz_0$) is as in Equations (1) and (2) described above, but the relationship with the dispersion relation used in Fourier phasing will be explained as follows. In the known Fourier phasing, first, the reception channel data is subjected to two-dimensional Fourier transform in a channel direction (u) and a time direction (t). A space obtained by performing the two-dimensional Fourier transform on channel data and having dimensions of frequency (f) and wave number (ku) in the channel direction is called an f-k space. In FIGS. 4(f) and 4(g), a frequency f normalized by a sound speed C is represented as the vertical axis. Then, in the Fourier phasing, the f-k space is converted to a k-k space based on the relational expression of angular frequency (phase rotation amount per time) and a wave number (phase rotation amount per distance), which is called a dispersion relation. If the conversion from the f-k space to the k-k space is called f-k migration, a real space image in the x-z space can be obtained by performing two-dimensional inverse Fourier transform on data in the k-k space obtained by the f-k migration. Specifically, the f-k migration conversion obtains data of a transfer position when the lattice point data ($kx_0$, $kz_0$) in FIG. 4C is transferred to the f-k space in FIG. 4F by complementing processing. The transfer position at this time is determined by the dispersion relation of Equation (3). Similarly, the transfer position of the lattice point ($kx_1$, $kz_1$) in FIG. 4D in the f-k space normalized by the sound speed $C_1$ shown in FIG. 4G is determined by the dispersion relational expression of Equation (4). The invention can correct the sound speed in the wave number space by deriving a relation between the coordinates ($kx_0$, $kz_0$) and the coordinates ($kx_1$, $kz_1$) expressed in the Equations (1) and (2) from two equations of the dispersion relation (3) in the case of the sound speed $C_0$ and the dispersion relation (4) in the case of the sound speed $C_1$.

$$f/c_0 = \text{sign}(k_{z0})\sqrt{k_{x0}^2 + k_{z0}^2} \quad \text{(Equation 3)}$$

$$f/c_1 = \text{sign}(k_{z1})\sqrt{k_{x1}^2 + k_{z1}^2} \quad \text{(Equation 4)}$$

The reconversion unit 43 generates the second real space image (see FIG. 4E) by performing inverse Fourier transform on the second wave number space data generated in step 208 (step 209). The obtained second real space image is data equivalent to the real space image obtained by phasing the reception signal (channel RF data) using the second delay time $T_2$ determined based on the second sound speed $C_1$.

For a plurality of sound speeds $C_2$, $C_3$ . . . other than the second sound speed $C_1$, when information of coordinates which should be calculated by interpolation in the first wave number space data is stored in the table storage unit 44, the real space images corresponding to respective sound speeds, of all the sound speeds $C_2$, $C_3$ . . . , are sequentially generated by executing the processing of steps 208 and 209 (step 210). The generated real space images corresponding to the respective sound speeds are stored in the image storage unit 46.

The sound speed selection unit 45 calculates and compares the index indicating the focus accuracy for the plurality of real space images stored in the image storage unit 46, selects the image having the highest index value, and displays the image on the display unit 50. The sound speed corresponding to the selected image maybe displayed on the display unit 50 as being close to the actual sound speed of the target to be imaged 10.

As an indicator of the focus accuracy, any index showing the coherency of the reception signal after phasing on the real space image may be used. For example, a power value of luminance, resolution, contrast, or the like in the image can be used. For example, the sound speed selection unit 45 selects one of the images with large luminance, images with a large power value, and images with high contrast as an image with high focus accuracy.

In addition, the sound speed selection unit 45 may set the sound speed corresponding to the selected image in the reception unit 32 via the control unit 36, and the reception unit 32 may replace the sound speed with the first sound speed and use the first sound speed for subsequent reception beamforming.

As described above, according to the ultrasound imaging apparatus of the present embodiment, the image equivalent to the image with the sound speed during reception beamforming being changed can be generated with a small amount of calculation.

Second Embodiment

An ultrasound imaging apparatus according to a second embodiment will be described. The ultrasound imaging apparatus includes a configuration the same as that of the ultrasound imaging apparatus of the first embodiment, but the operation of the sound speed selection unit 45 is different from that of the first embodiment.

Figure 5A:
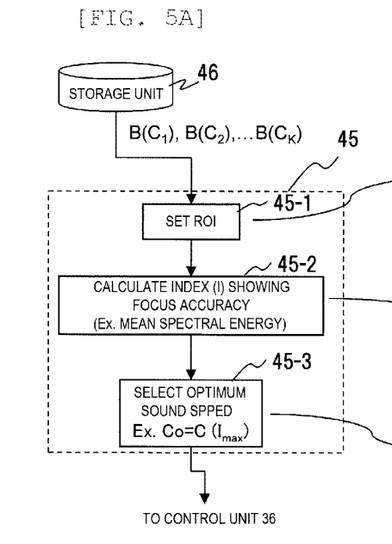
FIG. 5A is a diagram showing a configuration of a sound speed selection unit 45 according to a second embodiment.
Figure 5B:
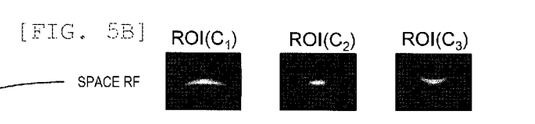
FIG. 5B is a diagram showing examples of the real space image in an ROI.
Figure 5C:
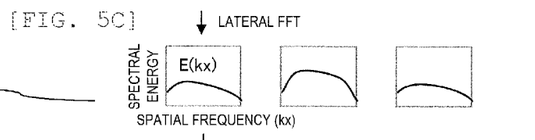
FIG. 5C is a graph showing changes in index values (intensity distribution) in ROI.
Figure 5D:
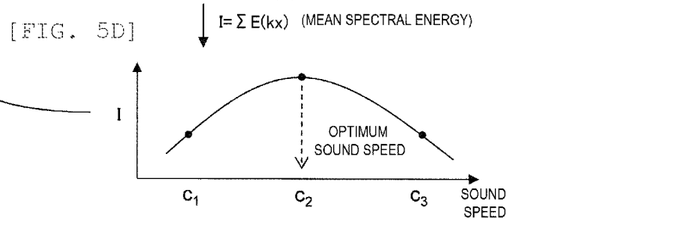
FIG. 5D is a graph showing changes in index values for respective sound speeds.

As shown in FIG. 5A, the sound speed selection unit 45 of the second embodiment includes an ROI setting unit 45-1 that reads a plurality of real space images for respective sound speeds from the image storage unit 46 and sets regions of interest (referred to as ROIs) at corresponding positions, and a calculation unit 45-2 that calculates an index showing the focus accuracy for each set ROI, and an optimum sound speed selection unit 45-3. Accordingly, for ROIs corresponding to the plurality of real space images as shown in FIG. 5B, an index showing coherency (for example, a luminance power distribution in the image) can be calculated as shown in FIG. 5C. Accordingly, as shown in FIG. 5B, the optimum sound speed selection unit 45-3 can calculate the sound speed that can maximize the coherency even if the sound speed at which the real space image is generated is discrete by obtaining a peak value through graphing a relationship between the index value and the sound speed value.

Other configurations and operations are similar to the configurations and operations of the first embodiment, and thus description thereof is omitted.

Third Embodiment

An ultrasound imaging apparatus according to a third embodiment will be described. The ultrasound imaging apparatus includes a configuration similar to the configuration of the ultrasound imaging apparatus of the second embodiment, but the operation of the sound speed selection unit 45 is different from that of the second embodiment.

Figure 6:
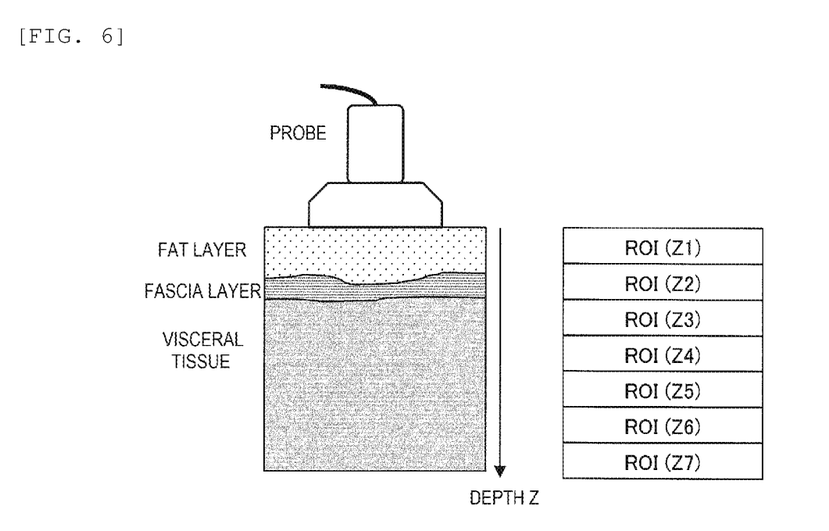
FIG. 6 is an illustrative diagram showing ROIs set by the sound speed setting unit 45 according to a third embodiment.

As shown in FIG. 6, the sound speed selection unit 45 of the third embodiment reads a plurality of real space images for respective sound speeds from the image storage unit 46, and sets a plurality of ROIs in the depth direction. In addition, an index indicating focus accuracy for each set ROI is calculated, and the indexes for ROIs having the same depth in a plurality of real space images are compared, and an optimum sound speed is selected. Accordingly, the optimum sound speed can be calculated for each depth.

When the target to be imaged 10 is a living body, tissue often has a multilayer structure in the depth direction, and the optimum sound speed can be obtained for each piece of tissue of the multilayer structure by calculating the optimum sound speed for each depth. Accordingly, the user has an advantage of being able to select the optimal sound speed according to the tissue the user wants to see.

Fourth Embodiment

An ultrasound imaging apparatus according to a fourth embodiment will be described. The ultrasound imaging apparatus has a configuration similar to that of the ultrasound imaging apparatus of the first embodiment, but the operation of the sound speed selection unit 45 is different from that of the first embodiment.

The sound speed selection unit 45 of the fourth embodiment calculates an index indicating the coherence of reception signals based on the wave number space data (FIG. 4D) generated in step 208 of FIG. 2, and selects the optimum sound speed. In this case, as an index indicating the coherence of the reception signals, an integrated value of respective data values (intensity) constituting the wave number space data can be used.

In this configuration, since the optimum sound speed can be obtained without reconverting into the real space in step 209, the amount of calculation can be reduced as compared with the first embodiment.

Other configurations and operations are similar to the configurations and operations of the first embodiment, and thus description thereof is omitted.

Fifth Embodiment

In the first to fourth embodiments described above, the ultrasound imaging apparatus includes the sound speed correction unit 40, but the sound speed correction unit 40 may be disposed in an image processing apparatus different from the ultrasound imaging apparatus, generate images in different sound speeds and select the optimal sound speed. For example, the image generated by the ultrasound imaging apparatus can be transferred to the image processing apparatus including the sound speed correction unit 40, and the processing of the embodiment can be performed by the operations shown in steps 207 to 211 in FIG. 2. Transfer of image data from the ultrasound imaging apparatus to the image processing apparatus may be performed via a communication line or the Internet. That is, it is possible to dispose the image processing device on a server as a cloud service, and generate images with different sound speeds, or select an optimum sound speed and transmit the images to the user.

REFERENCE SIGN LIST

10: target to be imaged
20: probe
21: ultrasonic element array
30: ultrasound imaging unit
40: sound speed correction unit
41: conversion unit
42: remapping processing unit
43: reconversion unit
44: table storage unit
45: sound speed selection unit
46: image storage unit

The invention claimed is:

1. An ultrasound imaging apparatus comprising:
an ultrasound imaging unit configured to receive ultrasonic waves reflected by a target to be imaged which receives transmission of the ultrasonic waves by a row of a plurality of ultrasonic elements, receive reception signals obtained for respective ultrasonic elements, and generate a first real space image by processing the reception signals using a first delay time determined based on a first sound speed;
a conversion unit configured to convert data of the first real space image into first wave number space data in a wave number space;
a remapping processing unit configured to generate data equivalent to second wave number space data by processing the first wave number space data, the second wave number space data obtained by converting a second real space image obtained when the reception signal is processed with a second delay time determined based on a second sound speed; and
a reconversion unit configured to generate the second real space image by inversely converting the data equivalent to the second wave number space data generated by the remapping processing unit.

2. The ultrasound imaging apparatus according to claim 1, wherein
the remapping processing unit generates the second wave number space data by obtaining sampling coordinate data shifted from sampling coordinates of the data constituting the first wave number space data by a distance determined in advance based on the first sound speed and the second sound speed by calculation.

3. The ultrasound imaging apparatus according to claim 1, wherein
the first and second real space images are two-dimensional images having two axes of a row direction (x) of the ultrasonic elements and a depth direction (z) of the target to be imaged, the first and second wave number space data is data in a two-dimensional wave number space with two axes of a wave number (kx) in the row direction of the ultrasonic elements and a wave number (kz) in the depth direction of the target to be imaged.

4. The ultrasound imaging apparatus according to claim 1, further comprising:

a sound speed selection unit configured to calculate and compares indexes showing focus accuracy of the first real space image and the second real space image and selects a first sound speed or a second sound speed corresponding to an image with a higher index value.

5. The ultrasound imaging apparatus according to claim 4, wherein
the sound speed selection unit calculates and compares the index for each of a plurality of regions of interest arranged at corresponding positions in the first real space image and the second real space image, and selects sound speed for each of the regions of interest.

6. The ultrasound imaging apparatus according to claim 1, further comprising:
a sound speed selection unit configured to calculate and compare indexes indicating coherence of the reception signals for the first wave number space data and the second wave number space data and select the first sound speed or the second sound speed corresponding to an image with a higher index value.

7. An image processing device comprising:
a conversion unit configured to convert an ultrasound image generated using a first delay time corresponding to a first sound speed into first wave number space data in a wave number space;
a remapping processing unit configured to generate data equivalent to second wave number space data by processing the first wave number space data, the second wave number space data obtained by converting a second real space image obtained when the reception signal is processed with a second delay time determined based on a second sound speed; and
a reconversion unit configured to generate the second ultrasound image by inversely converting data equivalent to the second wave number space data generated by the remapping processing unit.

8. A non-transitory, computer-readable medium containing instructions configured for processing ultrasound images on a computer, that comprises operating:
a conversion unit configured to convert an ultrasound image generated using a first delay time corresponding to a first sound speed into first wave number space data in a wave number space;
a remapping processing unit configured to generate data equivalent to second wave number space data by processing the first wave number space data, the second wave number space data obtained by converting a second real space image obtained when the reception signal is processed with a second delay time determined based on a second sound speed; and
an inverse conversion unit configured to generate the second ultrasound image by inversely converting the data equivalent to the second wave number space data generated by the remapping processing unit.

* * * * *